Figure 7:
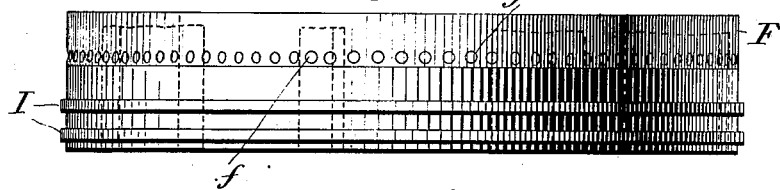

No. 616,160. Patented Dec. 20, 1898.
T. L. & T. J. STURTEVANT.
MILLSTONE.
(Application filed Feb. 8, 1898.)
(No Model.) 3 Sheets—Sheet 1.
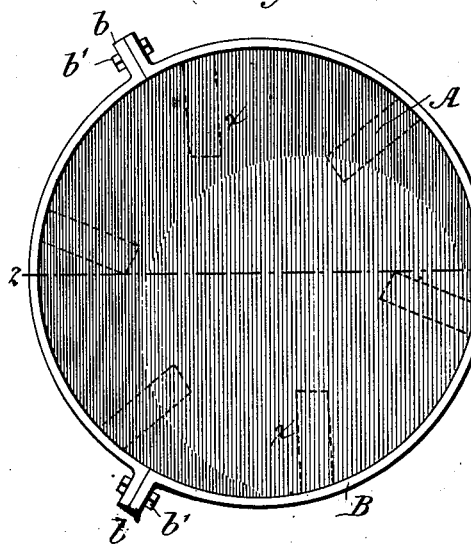
Fig. 1.
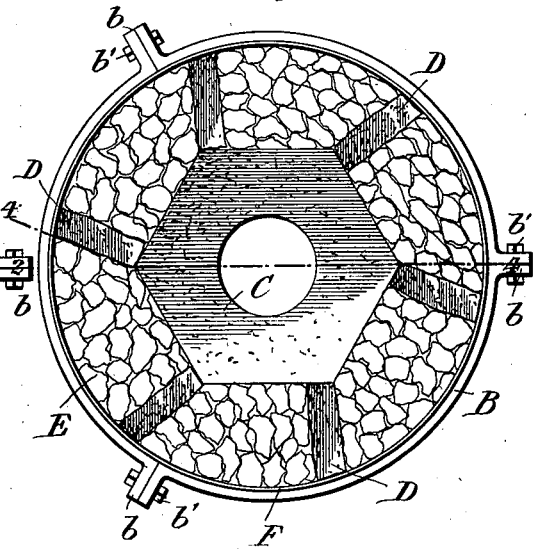
Fig. 3.
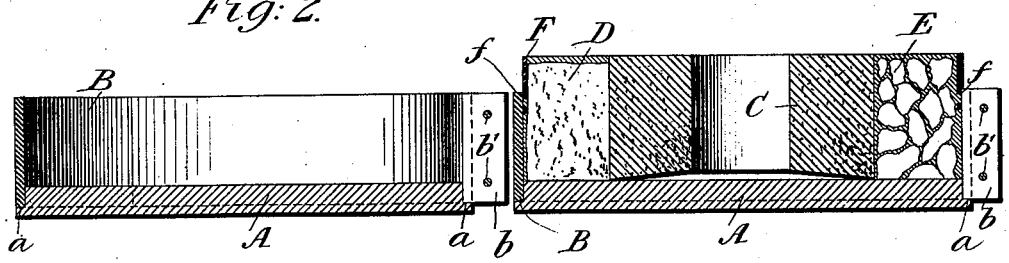
Fig. 2.
Fig. 4.
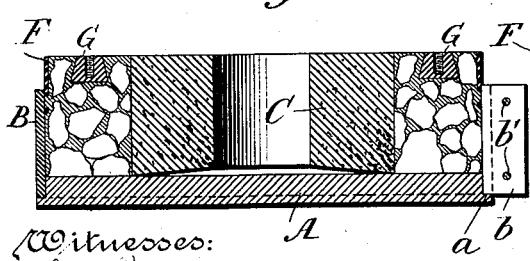
Fig. 5.
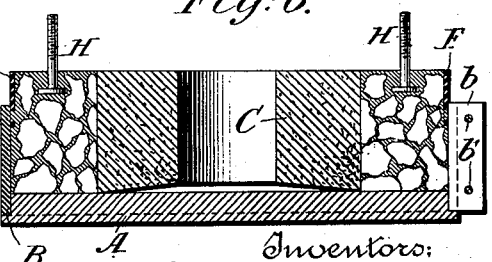
Fig. 6.
Witnesses:
J. A. Rennie
E. A. Bulloch
Inventors:
Thomas L. Sturtevant
Thomas J. Sturtevant,
By their Attorneys,
Muldoon Davidson Wight No. 616,160. Patented Dec. 20, 1898.
T. L. & T. J. STURTEVANT.
MILLSTONE.
(Application filed Feb. 8, 1898.)

(No Model.) 3 Sheets—Sheet 2.

Witnesses:
J. A. Rennie
E. A. Buerch

Inventors:
Thomas L. Sturtevant and
Thomas J. Sturtevant.
By their Attorneys,
Bacon, Davidson & Wight.

No. 616,160. Patented Dec. 20, 1898.
T. L. & T. J. STURTEVANT.
MILLSTONE.
(Application filed Feb. 8, 1898.)
(No Model.) 3 Sheets—Sheet 3.
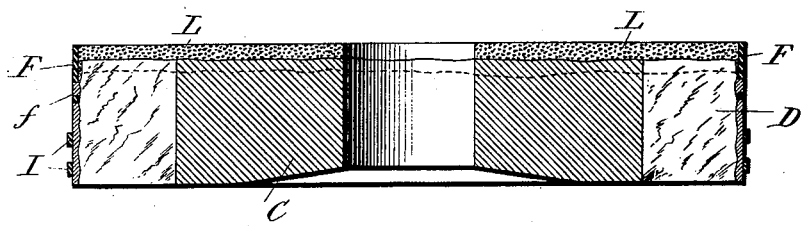
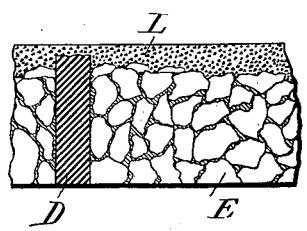
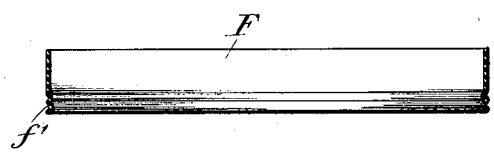
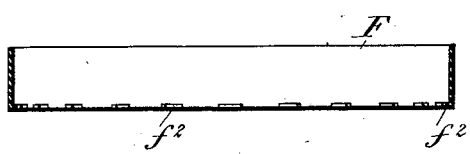
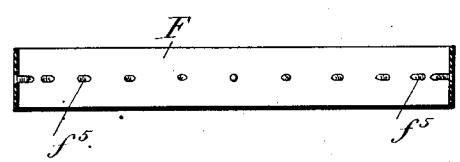
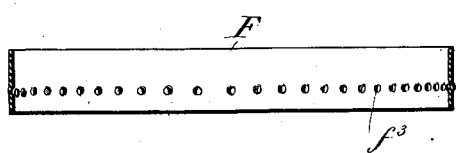
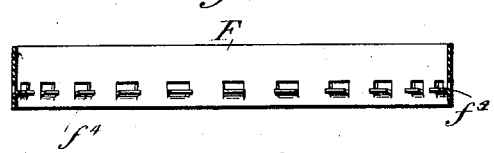
Witnesses:
J. A. Kennis
E. A. Bullock
Inventors;
Thomas L. Sturtevant and
Thomas J. Sturtevant.
By their Attorneys,
Baldwin, Davidson & Wight

UNITED STATES PATENT OFFICE.

THOMAS L. STURTEVANT, OF QUINCY, AND THOMAS J. STURTEVANT, OF FRAMINGHAM, MASSACHUSETTS, ASSIGNORS TO THE STURTEVANT MILL COMPANY, OF PORTLAND, MAINE, AND BOSTON, MASSACHUSETTS.

MILLSTONE.

SPECIFICATION forming part of Letters Patent No. 616,160, dated December 20, 1898.

Application filed February 8, 1898. Serial No. 669,534. (No model.)

*To all whom it may concern:*

Be it known that we, THOMAS L. STURTEVANT, residing at Quincy, in the county of Norfolk, and THOMAS J. STURTEVANT, residing at Framingham, in the county of Middlesex, State of Massachusetts, citizens of the United States, have invented certain new and useful Improvements in Millstones and in the Method of Making Them, of which the following is a specification.

Our invention relates to composite millstones made of small irregular lumps of abrading material, such as emery, and a binding material, such as metal. Millstones of this character are shown in Letters Patent of the United States granted to Thomas L. Sturtevant and W. H. Ellis, No. 483,504, of September 27, 1892. This patent shows a millstone in which the working face of the stone or a portion of it is constructed of molten metal, such as zinc, combined with small irregular lumps of abrading material, such as emery. In the preferred form of millstone shown in said patent the skirt is formed of sections of lumps of emery embedded in molten metal and furrow-strips arranged between the sections. The bosom of the stone is formed by a piece of burstone or Esopus stone. The skirt-section and furrow-strip when assembled are bound together by a hoop or band.

The patent of T. L. Sturtevant, No. 483,179, of September 27, 1892, describes a method of making millstones in which furrow-strips are arranged within a forming ring or mold upon a smooth plate. (Small irregular lumps of emery are arranged between the furrow-strips, and molten metal is then poured over the furrow-strips and the lumps of emery, and the skirt is then secured to a bosom-piece.) According to our present invention we introduce certain improvements in the method of forming millstones of this class, and also improve the article. We place upon and around a circular plate a circular forming-ring, preferably made in sections, then arrange furrow-strips upon the plate inside the ring, arrange small irregular lumps of abrading material between the furrow-strips, insert a strengthening-ring inside the forming-ring, then fill in more abrading material inside the strengthening-ring, and then pour molten metal over the lumps of abrading material and between the furrow-strips and cause it to fill the interstices between the lumps of abrading material and furrow-strips and take hold upon the strengthening-ring. The entire millstone may be made in this way without a separate bosom-piece, or a bosom-piece may be first placed in the mold before the metal is poured in, or a core may first occupy the place of the bosom-piece, which may be withdrawn, and a bosom-stone subsequently attached. We sometimes also apply a backing of some such material as cement to the stone to increase its weight and save the more valuable material, and we may attach fastening devices to the metallic portion of the stone, adapted to engage with the backing or other part of the millstone-fixtures, to which the grinding portion of the stone is attached. The furrow-strips are preferably made to enter the cement backing, thereby strengthening the stone very materially.

Figure 8:
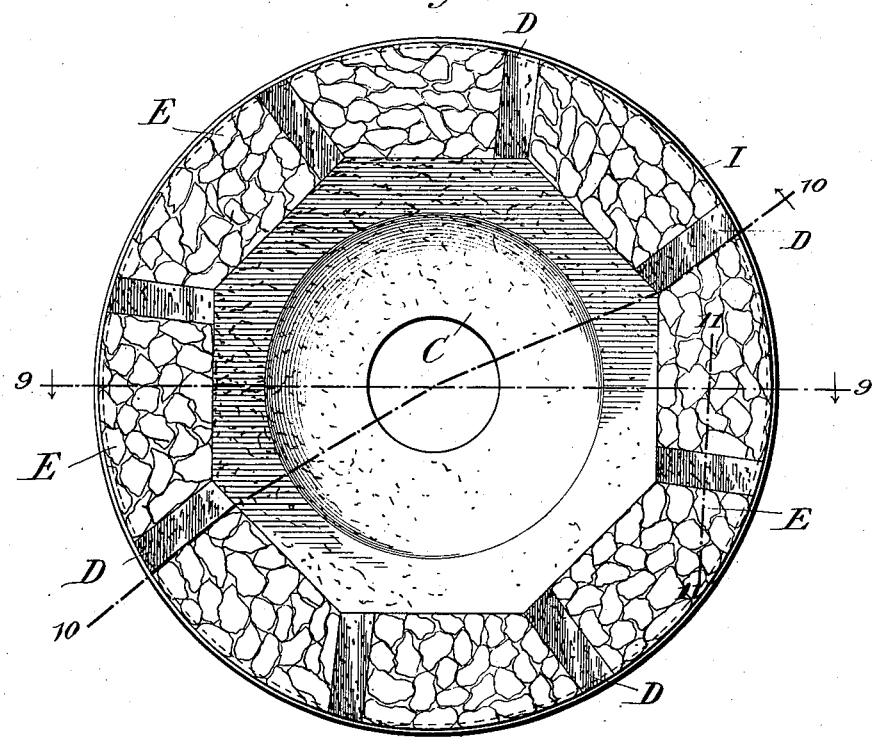
Figure 9:
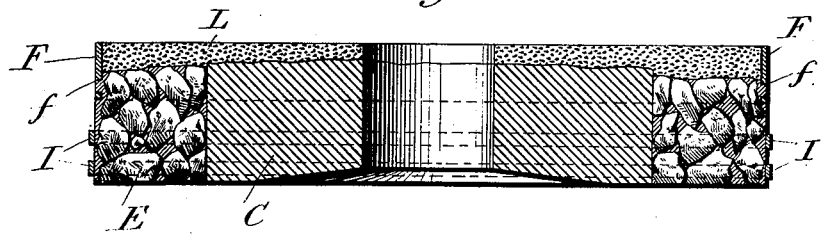

In the accompanying drawings, Figure 1 is a plan view of the forming-mold, comprising a circular plate and a forming-ring made in sections. Fig. 2 shows a central transverse section thereof on the line 2 2 of Fig. 1. Fig. 3 shows a plan view of the mold filled with the bosom-piece, the furrow-strips, the small irregular lumps of emery, and the strengthening-ring. Fig. 4 shows a vertical section thereof on the line 4 4 of Fig. 3, and shows in addition molten metal forming part of the skirt of the stone. Fig. 5 shows a transverse section through a millstone completely formed in accordance with our invention, with the devices adapted for the attachment of the back of the stone to a cement backing or other part of the millstone-fixtures. Fig. 6 is a view similar to Fig. 5, showing a modified form of fastening device. Fig. 7 is a side elevation of a completed millstone constructed in accordance with our invention. Fig. 8 is a plan view of the same. Fig. 9 shows a vertical transverse section on the line 9 9 of Fig. 8. Fig. 10 shows a transverse section on the line 10 10 of Fig. 8. Fig. 11 is a detail view in section showing particularly how the furrow-strips are secured to the cement backing. Fig. 12 shows a modified form of strengthening-ring. Figs. 13, 14, 15, and 16 show further modifications of the strengthening-ring. Fig. 17 shows a central transverse section, on a small scale, of a modified form of mold; and Fig. 18 is a similar view of another modification.

In carrying out our invention we secure to a circular plate A a forming-ring B, preferably made in three sections, flanged at $b$ and secured together by bolts $b'$. The plate A is preferably rabbeted at $a$ to receive the ring B. These parts (shown in Figs. 1 and 2) constitute the mold. By the construction of the devices shown in these figures a perfectly true circular form is provided which will not be destroyed when the stone-forming material is placed in the mold.

Figs. 17 and 18 show modifications of the mold. Instead of rabbeting the plate, as shown in Fig. 2, the ring B may be secured around the edge of the plate A or the ring B may be secured inside a flange $a'$ on the plate A, as shown in Fig. 18. In either case the ring B is made to assume a perfectly true circular form, and thus give proper form to the periphery of the stone. We sometimes form radial grooves $x$ in the plate A, as shown in Fig. 1, to act as guides for positioning the furrow-strips in assembling the parts of the stone.

To form the stone, we first preferably insert in the center of the mold a bosom-piece C, or we may substitute a suitably-formed core for the bosom-piece, and in some instances no separate bosom-piece is used, but the entire stone is made up of the same material that forms the skirt. After the furrow-strips D are suitably arranged we place between them small irregular lumps E of abrading material, such as emery, and when a sufficient quantity of this material has been supplied we place in position a strengthening-ring F, which is adapted to be firmly secured to the skirt of the stone. Preferably the ring F is provided with an annular series of perforations $f$, as indicated in Figs. 4 and 7; but other means hereinafter described may be employed for the same purpose. The perforated portion of the ring should be located just below the top edge of the forming-ring B. After having filled in more abrading material inside the strengthening-ring we pour into the mold molten metal, such as zinc or other suitable binding material; but molten zinc is preferred, as this after long experience has been found to be the best material. The metal fills all the interstices between the lumps of abrading material and passes through the perforations $f$ in the ring. When the metal has set, the ring is first secured by the metal projecting through the perforations in the ring, and the lumps of emery are firmly bound together, and the furrow-strips are securely held in place. The metal which passes through the perforations in the strengthening-ring is firmly united to the metal within the skirt, and a perfectly solid and strong connection between the strengthening-ring and the skirt is thereby obtained. The working face of the stone is formed next to the plate A. The opposite side or back of the stone is in use secured to suitable millstone-fixtures.

In order to save the more expensive material used in making the working portions of the stone, we generally attach the rear face of the stone to a cement backing, as shown in Fig. 9. This cement backing may be filled in up to the upper edge of the ring F or it may be made of any suitable size and weight.

The ring F prevents any tendency of the stone to crack or fly apart owing to centrifugal force or other causes, as well as affording a means for attaching the cement backing.

It is sometimes desirable to provide some special means for anchoring the stone to the cement backing or for attaching it to the millstone-fixtures. In the manufacture of the stone we therefore sometimes place in position fastening devices G and H, such as shown in Figs. 5 and 6. These are placed in position before the molten metal is poured into the mold, and the metal is made to cover the inner enlarged ends of the fastening devices, so that when the mold is filled the devices will be firmly fixed in position. We find that large economy results from this method of manufacture, and it avoids the necessity of drilling the stone after the metal has cooled and hardened. In order to still further strengthen the stone and prevent the parts from separating when in use, we may also apply to the front or working face thereof strengthening-hoops I, which may be shrunk on or applied in any suitable way; but we deem it important that the hoop or strengthening-ring F should be applied not by being shrunk on, but by a more permanent and reliable connection.

When the ring is perforated, as shown in Figs. 4 and 7, or when it is provided with equivalent devices which are attached to the skirt of the stone during the process of forming the skirt, a superior product is obtained. When thus applied, the ring is of exactly the same shape as the skirt—namely, circular—and therefore no openings can be left between the skirt and the ring, but a perfectly tight fit is insured. The molten metal which passes through the perforations $f$ not only fills the perforations, and thus insures a tight fit, but is tightly secured to the skirt, and there is no danger of loosening.

Instead of forming the ring F with perforations we may form it with corrugations $f'$, as indicated in Fig. 12, or with a bottom flange $f^2$, which may be divided into sections, as indicated in Fig. 13, or the ring may be indented with an annular series of recesses $f^3$, as indicated in Fig. 15, or lips $f^4$ may be cut out of the ring and turned down, as indicated in Fig. 16, thus affording not only perforations, through which the metal may flow, but also projections or lugs on the inner side, which will become embedded in the metal. We may also form an annular series of perforations in the ring and insert pegs or screws $f^5$ in them, which may become embedded in the molten metal while forming the skirt, or the screws may be inserted after the skirt is formed; but we do not prefer this latter way of attaching the ring.

We have described several ways of embodying our improvements which are deemed sufficient to illustrate the best ways now known to us of carrying out our invention.

The furrow-strips D are preferably so arranged that they project beyond the lumps of emery into the cement backing L, as indicated in Figs. 10 and 11. This gives additional strength to the stone, especially when it is nearly worn down. After the stone has been used for a long time and the emery or abrading material is gone there is nothing left but the strengthening-ring, the furrow-strips, and the cement backing to hold the millstone together. By arranging the ends of the furrow-strips in cement backing they are held firmly in place, even after the abrading material is worn very thin, and all the abrading material may be used or worn down without disarranging the furrow-strips.

We find that millstones constructed in accordance with our present invention last longer and do better work than any others which we have heretofore used, and there is great economy in the method of manufacture which we employ.

We claim as our invention—

1. The method herein described of manufacturing composite millstones, which consists in arranging furrow-strips and lumps of abrading material upon a circular plate within a circular forming-ring, placing a strengthening-ring within the forming-ring, and then pouring molten metal into the mold and causing it to enter the interstices between the lumps of abrading material and the furrow-strips, and to attach the strengthening-ring to the skirt of the stone.

2. The method herein described of forming composite millstones, which consists in arranging on a circular plate within a forming-ring composed of separate sections, furrow-strips and lumps of abrading material, placing within the forming-ring a strengthening-ring, then pouring molten metal into the mold and causing it to fill the interstices between the lumps of abrading material, and to unite the strengthening-ring to the skirt of the stone, and then removing the sections of the forming-ring from the millstone thus produced.

3. The method herein described of forming composite millstones, which consists in arranging within a forming-ring upon a circular plate furrow-strips and lumps of abrading material, a bosom-stone, fastening devices, and a strengthening-ring, then pouring molten metal into the mold and causing it to fill the interstices between the lumps of abrading material, the furrow-strips and the bosom-piece, unite the strengthening-ring to the skirt of the stone, and permanently attach the fastening devices to the stone.

4. The method herein described of forming composite millstones, which consists in arranging on a circular plate, within a circular forming-ring, furrow-strips, irregular lumps of abrading material, and a strengthening-ring, then pouring molten metal into the mold and causing it to fill the interstices between the lumps of abrading material and the furrow-strips, and to firmly unite the strengthening-ring to the skirt of the stone, and then applying a backing of other material, such as cement, to the stone for the purpose specified.

5. The method herein described of manufacturing composite millstones, which consists in arranging furrow-strips and lumps of abrading material upon a circular plate within a circular forming-ring, placing a perforated strengthening-ring within the forming-ring and then pouring molten metal into the mold and causing it to enter the interstices between the lumps of abrading material and the furrow-strips, and to pass through the perforations in the strengthening-ring.

6. A millstone, comprising a skirt composed of irregular lumps of abrading material arranged in a metallic binder which is cast around them, and a strengthening-ring applied to the periphery of the skirt within which the skirt is cast and which is provided with an annular series of attaching devices united to the periphery of the skirt by the cast metal.

7. A millstone, comprising a skirt composed of irregular lumps of abrading material arranged in a metallic binder, and a perforated strengthening-ring applied to the periphery of the skirt within which the skirt is cast, and having the binding material projecting into the perforations.

8. A millstone, comprising a skirt composed of lumps of abrading material and a binding metal, and a strengthening-ring arranged around the periphery of the skirt within which the skirt is cast and which is provided with perforations filled with the same metal that binds together the lumps of abrading material.

9. A millstone, comprising a skirt composed of lumps of abrading material, a cast-metal binder, furrow-strips, a cement backing, and a strengthening-ring within which the skirt is cast and which is provided with attaching devices united to the skirt by the cast metal.

10. A millstone comprising a skirt composed of lumps of abrading material, a metal binder and furrow-strips, and a cement backing into which the inner ends of the furrow-strips project.

11. A millstone, comprising a skirt composed of lumps of abrading material, a metal binder, furrow-strips, and a strengthening-ring firmly united together by the molten metal used in forming the skirt, and a cement backing into which the inner ends of the furrow-strips project.

In testimony whereof we have hereunto subscribed our names.

THOMAS L. STURTEVANT.
THOMAS J. STURTEVANT.

Witnesses:
O. B. MONEY,
LLOYD MAKEPEACE.